US008570343B2

(12) United States Patent
Halstead

(10) Patent No.: US 8,570,343 B2
(45) Date of Patent: Oct. 29, 2013

(54) AUTOMATIC GENERATION OF 3D MODELS FROM PACKAGED GOODS PRODUCT IMAGES

(75) Inventor: Rodd M. Halstead, Lincoln, MA (US)

(73) Assignee: Dassault Systemes, Velizy Villacoublay (FR)

(*) Notice: Subject to any disclaimer, the term of this patent is extended or adjusted under 35 U.S.C. 154(b) by 89 days.

(21) Appl. No.: 12/763,307

(22) Filed: Apr. 20, 2010

(65) Prior Publication Data

US 2011/0254840 A1    Oct. 20, 2011

(51) Int. Cl.
*G09G 5/00* (2006.01)
(52) U.S. Cl.
USPC .................. 345/630; 345/629; 345/419
(58) Field of Classification Search
USPC ................ 345/420, 419, 630, 442, 629
See application file for complete search history.

(56) References Cited

U.S. PATENT DOCUMENTS

| 6,515,659 | B1* | 2/2003 | Kaye et al. ................ 345/419 |
| 7,212,664 | B2 | 5/2007 | Lee et al. |
| 7,602,404 | B1* | 10/2009 | Reinhardt et al. ......... 345/629 |
| 2002/0093538 | A1* | 7/2002 | Carlin ...................... 345/778 |
| 2003/0063086 | A1* | 4/2003 | Baumberg ................ 345/420 |
| 2003/0218607 | A1* | 11/2003 | Baumberg ................ 345/419 |
| 2006/0232583 | A1* | 10/2006 | Petrov et al. ............. 345/419 |
| 2008/0030497 | A1* | 2/2008 | Hu et al. .................. 345/419 |
| 2008/0294401 | A1* | 11/2008 | Tsin et al. ................ 345/589 |
| 2009/0122058 | A1* | 5/2009 | Tschesnok ............... 345/420 |
| 2009/0154794 | A1 | 6/2009 | Kim et al. |
| 2010/0265251 | A1* | 10/2010 | Vining et al. ............. 345/420 |
| 2010/0295854 | A1* | 11/2010 | Miller ...................... 345/427 |
| 2010/0328305 | A1* | 12/2010 | Vining ..................... 345/419 |
| 2010/0328307 | A1* | 12/2010 | Lim ........................ 345/420 |

FOREIGN PATENT DOCUMENTS

| CN | 101017575 A | 8/2007 |
| CN | 101071514 A | 11/2007 |
| CN | 101632102 A | 1/2010 |
| EP | 1 510 973 A2 | 3/2005 |
| WO | WO 02/39216 A2 | 5/2002 |
| WO | WO 2008/084937 A1 | 7/2008 |

OTHER PUBLICATIONS

Yan, Pinkung et al., "3D Model based Object Class Detection in An Arbitrary View", School of Electrical Engineering and Computer Science, University of Central Florida, 2009, p. 1-6.*
Liebelt, Joerg et al., "Viewpoint-Independent Object Class Detection using 3D Feature Maps", IEEE, 2008, p. 1-8.*
htttp://www.strata.com/products/strata_3D_cx_suite/strata_foto_3d_cx; "Strata The Power of 3D", 4 pages, retrieved from Internet, Feb. 18, 2010.
Khan, S.M., et al., "A Homographic Framework for the Fusion of Multi-view Sihouettes," in *ICVV*, 2007.
First Office Action with Search Report, dated Jan. 21, 2013, Chinese Application No. 2011/10101031.2, consisting of 26 pages.

\* cited by examiner

*Primary Examiner* — Chante Harrison
(74) *Attorney, Agent, or Firm* — Hamilton, Brook, Smith & Reynolds, P.C.

(57) ABSTRACT

A computer-implemented method and apparatus of 3D modeling accesses product data of a consumer good product. The product data includes 2D image data of the subject consumer good product and shape information of the subject consumer good product. An extractor extracts the shape information from the product data, including a 3D shape class of the subject consumer good product, and derives a detailed 3D shape graph. The detailed 3D shape graph represents an orthographically correct 3D outline shape of the subject consumer good product. As a function of the determined 3D shape class, a mesh generator generates a 3D mesh of the subject consumer good product from the detailed 3D shape graph. An image mapper projects images onto the 3D mesh, the images being of the subject consumer good product and from the 2D image data. A 3D model of the subject consumer good product results and is configured for interactive display on web pages and in other user-interactive environments.

24 Claims, 12 Drawing Sheets

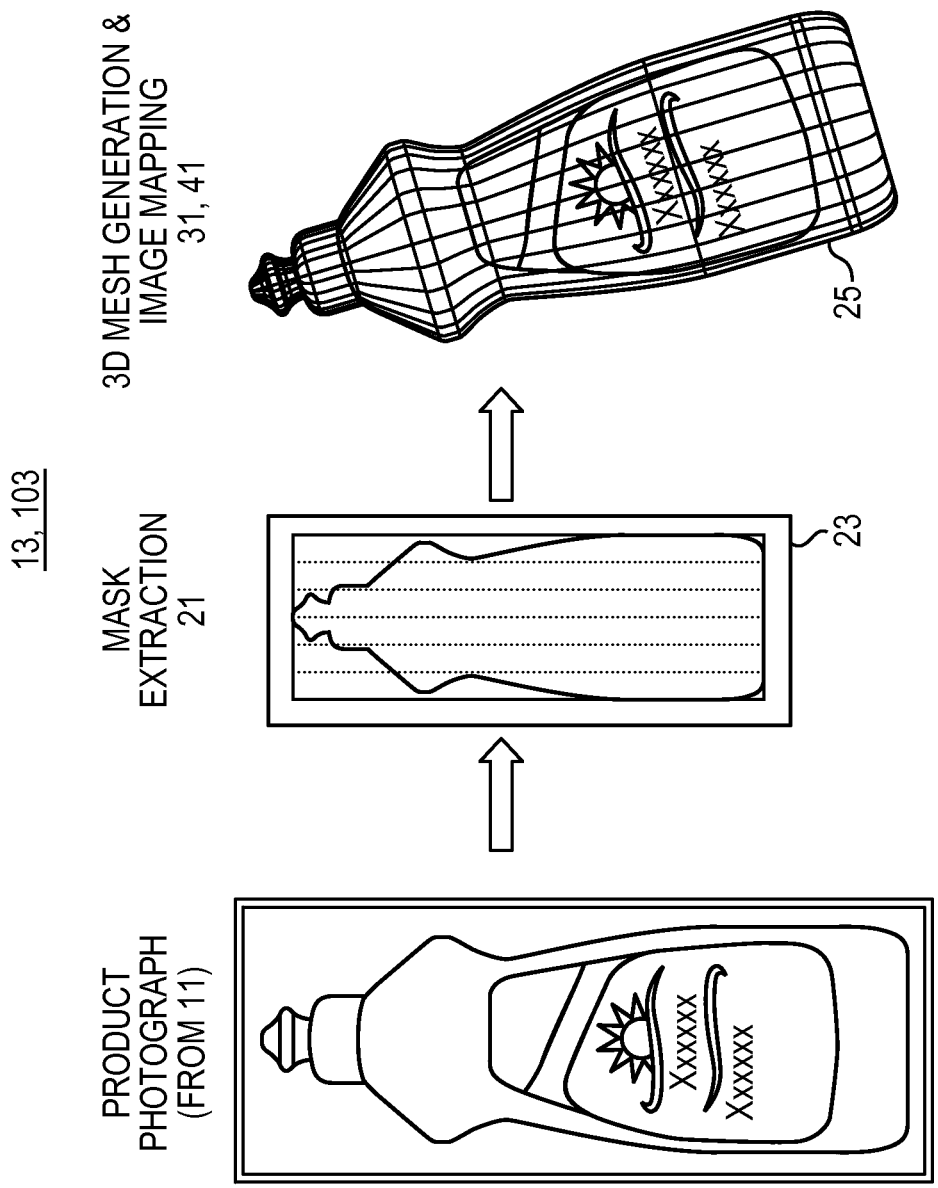

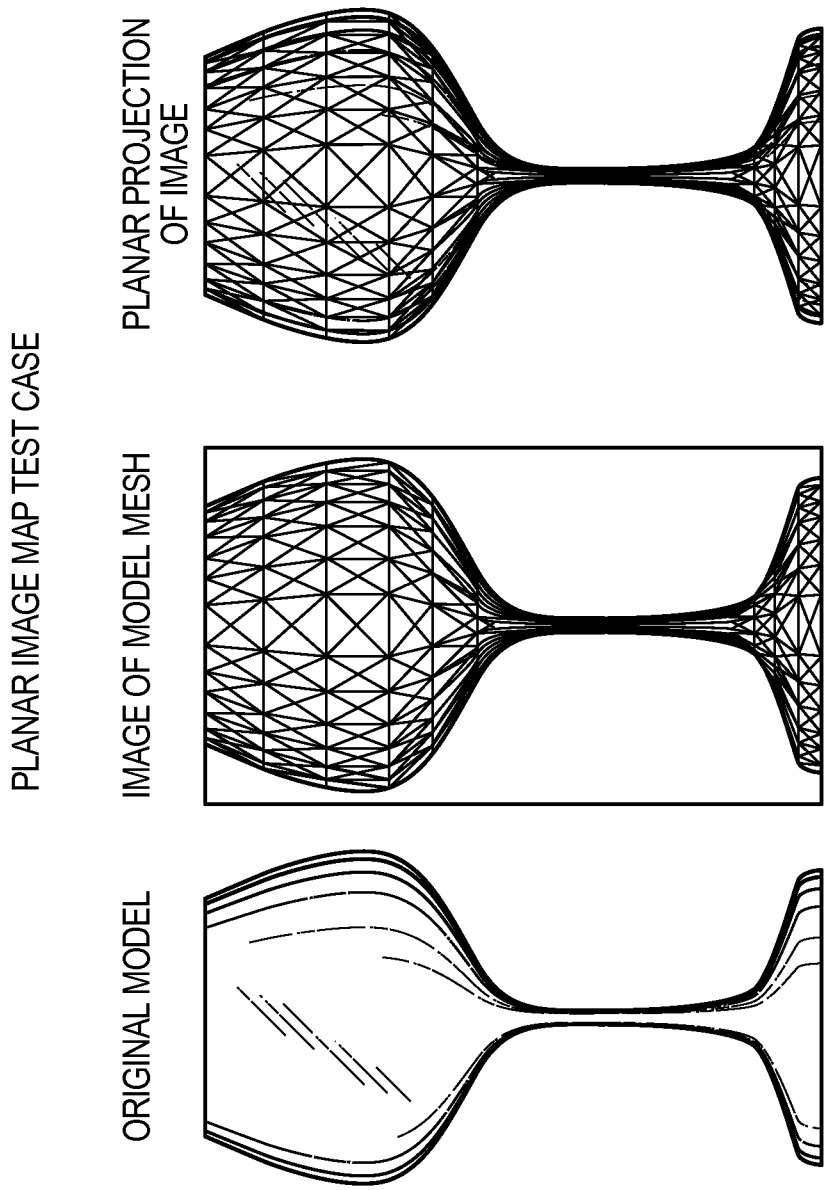

AUTOMATIC GENERATION OF 3D MODELS FROM PACKAGED GOODS PRODUCT IMAGES

BACKGROUND OF THE INVENTION

A technical field of the invention relates to scalable content creation for 3D Interactive Experiences, and 3D Interactive Simulations including, but not limited to, video gaming and online shopping/viewing.

Computer 3D modeling techniques have been used to build 3D packaged goods for display in interactive, 3D simulations of store interiors. In particular, 3D modeling has been used to implement the end user experience of viewing a product, its store/shelf context and the experience of "picking up" the product to view and read product packaging text online.

In applications where 3D models of packaged goods were built for in-store display, two strategies have been used to build shelf (package goods) 3D model content.

The first strategy used manual creation of 3D models from photographs and product measurement information, using AutoDesk® 3DS Max®, Maya® or other general purpose modeling applications. While the workflow to systematically produce larger numbers of models may be planned and organized, the unit of work is still based on manual modeling of shapes and manual creation of texture maps.

A second strategy used general purpose photo-based 3D modeling applications. There exists a variety of commercially available software and approaches to solving the general problem of creating a 3D model from a physical object. An example of this software is "Strata Foto 3D" which "lets one use a standard digital camera to capture real-world objects as fully textured 3D models." General purpose photo modeling of products (packaged goods) works well to produce small numbers of product models. The main limitation of this technique is that the 3D model created from multiple photographs requires significant manual labor to correct defects and to rescale geometry for usage in online 3D applications.

Limitations of existing solutions are based on the amount of manual (expert 3D artist) work required to process 3D models for use in computer applications. Because each model must be partly or completely created by hand (in a complex, general purpose 3D modeling application), any modeling workflow based on this process is not scalable.

A second problem observed with 3D models based on photo modeling systems is irregularity of the geometric mesh. An irregular mesh makes downstream resizing/processing of models harder, and locks the workflow into a cycle of future manual editing and manual adjustment of model content.

A disadvantage of prior art is reliance on downstream editing of models in the content production process. This is a problem because A) input data is continuously being updated with new images, and B) output specifications can shift due to new requirements/improvements in the online shopper experience application.

Reliance on manual editing locks content production into a cycle of continued hand editing. When larger changes are required, old output is discarded and the full cost of content creation must be born a second (or third or Nth) time.

SUMMARY OF THE INVENTION

The present invention addresses the foregoing problems of the prior art. In particular, the present invention provides an automated process to generate 3D models of package goods that are suited to the visualization requirements of online, interactive 3D experience applications (like interactive 3D shopping experiences, interactive 3D videogames and the like).

The invention solves the subject problem by understanding that most product packaging can be modeled from geometric primitives (like cylinders, or boxes) which can be deformed to capture the precise 3D shape (or object outline) of the product from front, side and top views of the product, as captured by standardized product photographs.

In one embodiment, Applicant takes advantage of the existence of large libraries of high resolution packaged goods product images, which exist to support the industry of 2D visual planogramming. In planogramming, 2D representations of store shelf layouts are created from standardized shelf layout information encoded in store shelving "planograms".

This means that large libraries of view point "calibrated" product photographs exist, linked to a database containing precise product size measurements. In this embodiment, the invention system starts from commercially available image libraries (or similarly processed original product 2D images with an image mask layer), extracts precise product shape information, generates a corresponding 3D representation from the shape information and shape classification data, and then maps the original photograph back onto that 3D representation using a planar projection. The image mask layer separates the photograph into a foreground and a background. The foreground comprises any pixel that is part of the product 2D image. The background comprises any pixel that is not part of the product 2D image where the background or surrounding space in the photographic scene is visible. The techniques for separating foreground from background in photographs/2D images are known, and the present invention does not rely on any particular image mask layer method.

A general goal in embodiments of the present invention is to create 3D models from 2D images and product meta data without downstream editing to the model. The key benefit of this approach is the ability to run (and rerun) the model processing to accommodate new or updated image content or make changes (and corrections) to model output.

Primary advantages of the present invention model processing include: automation, simplicity, reduction of human labor, speed and reproducibility, and standardized 3D model output. Secondary advantages include the ability to set and change model output parameters. This means that high quality 3D models with different mesh and image sizes or types can easily be generated. Further, databases with photographs and product size measurements can be turned into acceptable, high resolution 3D product (package goods) models, with no manual manipulation or modeling of the 3D data.

A computer-implemented method of 3D modeling embodying the present invention comprises:

accessing product data of a subject consumer good product, the product data including 2D image data of the subject consumer good product and shape information of the subject consumer good product;

extracting the shape information from the product data, said extracting including obtaining a 2D outline shape (i.e., the image mask) of the consumer good product and obtaining a 3D shape class of the subject consumer good product (e.g., as assigned or otherwise provided);

using the obtained 2D outline shape and 3D shape class, generating (or deriving) a detailed 3D shape graph;

generating a 3D mesh of the subject consumer good product as a function of the obtained 3D shape class by:

determining a series of cross sectional regions of the detailed 3D shape graph, each cross sectional region having a respective cross section with respect to a longitudinal axis of the subject consumer good product, wherein the cross section for a given cross sectional region is different than (i) the respective cross section of an immediately succeeding cross sectional region in series order (if any) and (ii) the respective cross section of an immediately preceding cross sectional region in series order (if any), such that cross sections change from one cross sectional region to a next cross sectional region in series order; and using the series of cross sectional regions, defining the 3D mesh of the subject consumer good product; and projecting onto the generated 3D mesh images of the subject consumer good product from the 2D image data, said projecting forming a 3D model of the subject consumer good product, the formed 3D model being configured for display on output.

The detailed 3D shape graph represents an orthographically correct 3D object outline/outline shape of the subject consumer good product from at least front and back view points.

The shape information includes width, height and depth measurements of the subject consumer good product, and includes an indication of 3D shape type or class of the subject consumer good product. Further the subject consumer good product is a packaged good having a container of any one or combination of types including:

a generally cylindrical bottle,
a generally cylindrical bottle with pump action type dispensing end,
a generally tubular dispensing tube,
an effectively box shaped carton,
a generally pillow shaped sack, bag or pouch and
a generally sack-like container bag or pouch with planar end (e.g., bottom end configured for standing).

In embodiments, the step of defining a 3D mesh of the subject consumer good product further includes determining a depth profile of the subject consumer good product along the longitudinal axis. Techniques employed in determining a depth profile may include shape generation.

In some embodiments, the step of determining a series of cross sectional regions of the detailed 3D shape graph includes curve fitting.

In accordance with one aspect of the present invention, the step of projecting employs planar projection of the 2D images of the subject consumer good product onto the generated mesh.

In some embodiments, the mesh generation combines the detailed 3D shape graph, the determined series of cross sectional regions and as available a depth profile. The depth profile may be of the subject instance or one associated with the 3D shape class of the subject consumer good product.

In another embodiment, computer apparatus for 3D modeling carries out the foregoing method steps. For example, an extractor accesses product data of the subject consumer good product from a data store and extracts shape data (e.g., the 2D image mask). The extractor further obtains 3D shape class of the subject consumer good product and derives the detailed 3D shape graph. From the detailed 3D shape graph, a mesh generator generates the subject specific mesh as a function of determined 3D shape class. An image mapper (or similar operation of a modeler) projects the 2D images onto the generated mesh and forms the 3D model of the subject consumer good product.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A-1C are block and schematic diagrams of one embodiment of the present invention.

FIGS. 7A-7C are schematic illustrations of the invention modeling technique from an initial image of the subject (a wine glass), to a mesh texture file of the subject, to the 3D model with initial image projected onto the subject mesh.

DETAILED DESCRIPTION OF THE INVENTION

A description of example embodiments of the invention follows.

For the Shopping/Store experience application, a key consideration is the need to build a package goods model creation process that is scalable to the size of an entire grocery store—on the order of 50,000 to 80,000 product models. This lead to the Applicant's insight that a level of modeling, acceptable for these visualization requirements, could be achieved using 2D images to generate 3D mesh, on to which the 2D images are reprojected, creating a custom high resolution 3D model for each available product image.

Figure 1A:
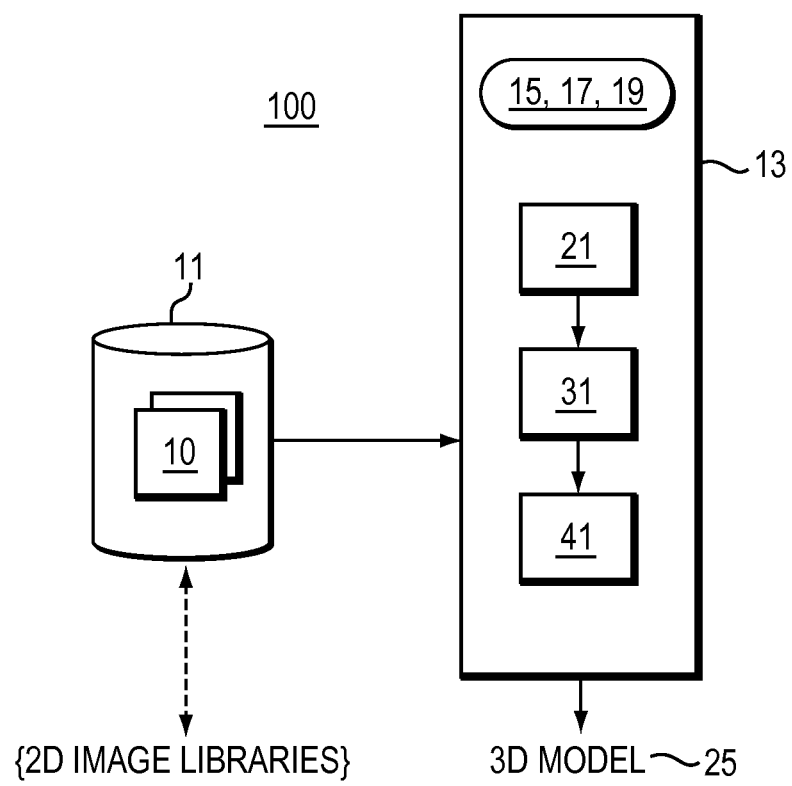

FIGS. 1A and 1B are illustrative of this approach and show an overview of a computer system 100 embodying the present invention. Computer system 100 includes a data store 11 and 3D modeler 13 formed of one or more processing modules 21, 31, 41 further detailed below. Data store 11 holds product data of various package goods (e.g., retail products). For each product (specific package), the product data includes (i) 2D images of the front, back, top and/or sides of the subject product, (ii) size measurements of the height, width and depth of the packaged product, and (iii) an indication of 3D shape type or class for the product.

In one embodiment, the 2D images are product photographs from existing image libraries or similarly processed original product images. Typically, an Alpha layer or channel of the image library files provides the 2D image mask or a 2D shape map (raw 2D shape data) of a respective product/package. This Alpha layer/image mask layer separates the photograph into a foreground and a background. The foreground includes any pixel that is part of the product 2D image and the background is the remaining pixels (any pixel that is not part of the product 2D image) where the background or surrounding space in the photographic scene is visible. Techniques for separating foreground from background in photographs/2D images are known, and embodiments of the present invention do not rely on image masks formed by any particular method.

Returning to FIG. 1, data store 11 references the available product images in a product table 10 using file path name, pointers/links or the like to the library files. The product table 10 also stores, for each product, attributes such as product dimensions (size measurements), 3D shape class indication and other product metadata such as the Name and UPC (Universal Product Code) associated with the individual package/product. Table 1 is exemplary of such a product table 10 of data store 11.

Figure 1C:
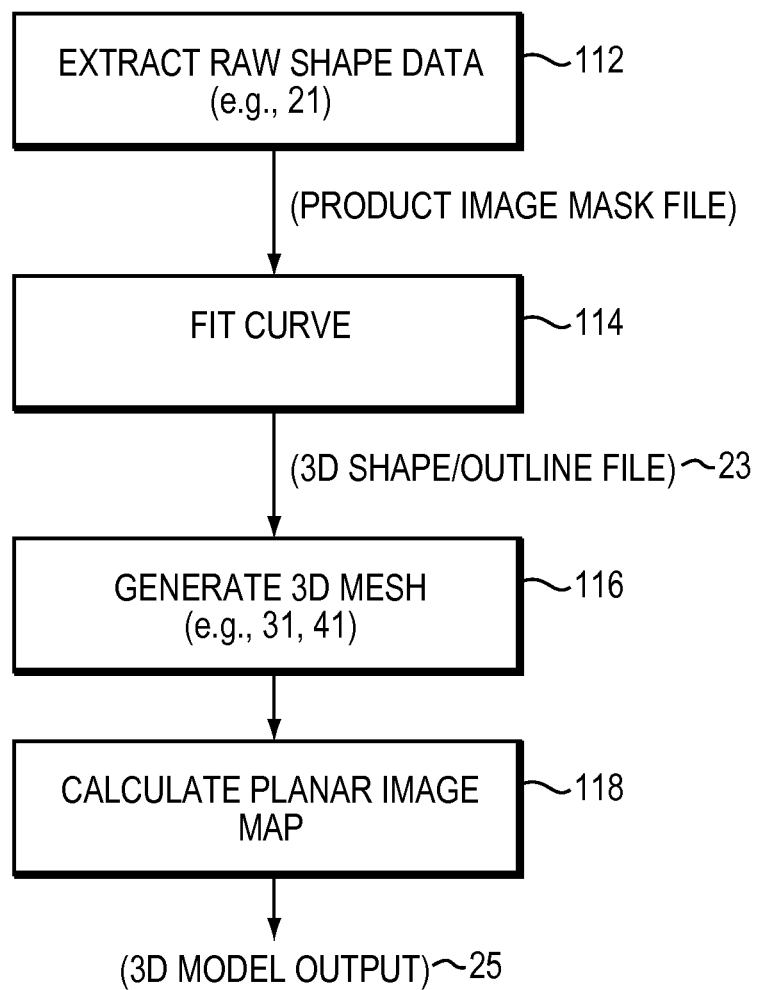

For each product in data store 11/product table 10, modeler 13 runs (executes) a 3D model generation process 103 summarized in FIG. 1B and further detailed in FIG. 1C. With reference to FIG. 1B, modeler 13 accesses product data (in product table 10) of a subject product. Specifically, data

TABLE 1

Example Product Table

| UPC | Product Name | W | H | D | Qty | | Shape | Image Ref-Front |
|---|---|---|---|---|---|---|---|---|
| 308250 | K& B 4 lb | 8.15 | 10.95 | 8.4 | 4 | lb | Bag | 8250.1_ |
| 308340 | K&B 35 lb | 20 | 24 | 5 | 35 | lb | Bag | 8340.1_ |
| 308490 | K&B Bits | 15.16 | 24.5 | 4.83 | 17.6 | lb | Bag | |
| 536358 | M Dog 12/5.5 oz | 10.2 | 6 | 6.7 | 5.5 | oz | Box | 6358.1_ |
| 201401 | Peds Beef 3.5 oz | 3.5 | 3.5 | 1 | 3.5 | oz | Other | 1401.1_ |
| 201404 | PedsLamb3.5 oz | 3.5 | 3.5 | 1 | 3.5 | oz | Other | 1404.1_ |
| ... | | | | | | | | |
| 400730 | I Sauce Beef | 2.95 | 8.12 | 1.85 | 11 | oz | Oval_RN | 0730.1_ |
| 400731 | I Sauce Cntry | 2.95 | 8.12 | 1.85 | 11 | oz | Oval_RN | 0731.1_ |
| 535294 | MDogSr CkRice | 3.4 | 1.5 | 3.4 | 5.5 | oz | Round | 3277.1_ |
| 535304 | MDog Lmb Rice | 3.4 | 1.5 | 3.4 | 5.5 | oz | Round | 3247.1_ |
| 801450 | PBone Orgl 8 lb | 9 | 13.5 | 4 | 8 | lb | Sack | 1450.1_ |
| 801451 | PBoneOrgl17.6 lb | 16 | 24 | 4 | 17.6 | lb | Sack | 1451.1_ |
| ... | | | | | | | | |

In modeler 13, for each 3D shape class or type 15, there is a respective 3D template 17 and corresponding rules 19. The 3D template 17 is for generating a generic 3D mesh of the corresponding class shape. In particular, template 17 provides proportional geometries in three dimensions for the object shape representative of the class. The corresponding rules 19 construct a product-specific 3D model from 2D product images and size measurement data when applied to the template mesh. The rules 19 include depth profile rules for the corresponding shape class.

Figure 2:
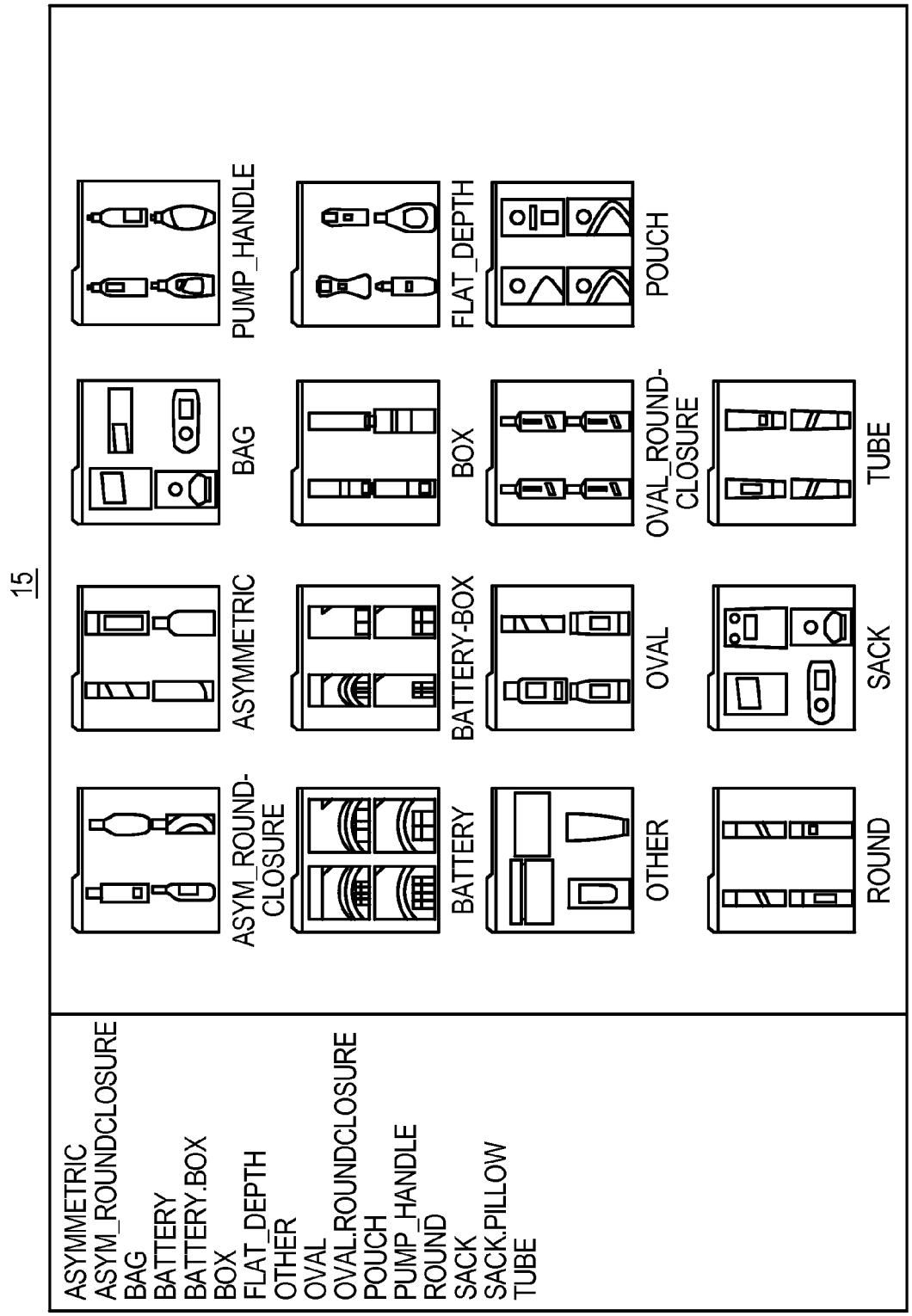
FIG. 2 is a schematic view of 3D shape classes in one embodiment.

An example of the 3D shape classes 15 supported in one embodiment is illustrated in FIG. 2. In this non-limiting example are the following 3D shape classes:
asymmetric,
asymmetric with a round closure,
bag,
battery box,
box,
flat depth,
other or miscellaneous,
oval,
oval with round closure,
pouch,
pump handle,
round,
sack,
sack pillow shaped, and
tube.
Other 3D-shape classes are suitable.

An important part of the content generation of the present invention is to treat every product package as an instance of a generic shape type (e.g., one of the shape classes 15). The indication of 3D shape class per product in the product table 10 of data store 11 enables system 100 to determine the 3D template 17 and the specific rules 19 to construct a respective 3D model from the 2D product image and size measurement data of the product. This shape class system is designed to be extensible, so when a new kind of package is discovered a new template 17 and construction rules 19 can be created to implement the type.

extractor (module) 21 of modeler 13 obtains the raw shape map data (i.e., the 2D image mask data) from the product 2D image file and obtains the size measurements and the 3D shape class of the subject product from the product table 10. From the extracted shape information, data extractor 21 forms a detailed 3D shape graph 23. The detailed 3D shape graph 23 is effectively a 3D shape map and represents an orthographically correct outline shape of the specific subject product, from at least the front and back viewpoints. Next processing modules 31, 41 of modeler 13 generate a 3D mesh based on the detailed 3D shape graph 23 and based on the 3D template 17 and rules 19 corresponding to the shape class indicated for the subject product. Finally, modeler 13 maps the original product images onto the generated mesh resulting in the 3D model 25 of the subject product.

The 3D model generation process 103 (modeler 13) is now discussed in greater detail with respect to one embodiment shown in FIG. 1C.

For each certain product, for example referenced by UPC number, modeler 13 runs the 3D model generation process 103 as follows. Step 112, as implemented by data extracter 21 for example, retrieves from the product table 10/data store 11 the size measurements and shape class for the subject product (indexed by UPC number). Next step 112/extracter 21 retrieves from the image reference in product table 10 the front image file of the subject product and opens the image Alpha layer. From that data layer, step 112 exports raw product 2D shape data expressed in image pixel coordinates (i.e., the 2D image mask).

Step 112 uses the exported raw product 2D shape information and forms a product image mask file. The product image mask file content is numeric data describing the 2D outline shape (2D image mask) of the product package extracted at pixel level from the product photograph(s)/images referenced in product table 10. Masks are calculated for both width (X coordinate) and height (Y coordinate) dimensions. Step 112 also calculates an additional width mask for cutout regions to determine the location of holes or other special features which occur inside the product 2D outline boundaries. Table 2 is exemplary of this mask data.

TABLE 2

Product Image Mask File

| UPC | Dimension | Row | Start | Stop |
|---|---|---|---|---|
| 1000000001.1.dat | WIDTH | 2199 | 145 | 669 |
| 1000000001.1.dat | WIDTH | 2198 | 145 | 670 |
| 1000000001.1.dat | WIDTH | 2197 | 150 | 670 |
| 1000000001.1.dat | WIDTH | 2196 | 149 | 671 |
| 1000000001.1.dat | WIDTH | 2195 | 149 | 671 |
| ... | | | | |
| 1000000001.1.dat | WIDTH | 5 | 519 | 720 |
| 1000000001.1.dat | WIDTH | 4 | 528 | 710 |
| 1000000001.1.dat | WIDTH | 3 | 539 | 699 |
| 1000000001.1.dat | WIDTH | 2 | 551 | 687 |
| 1000000001.1.dat | WIDTH | 1 | 565 | 671 |
| 1000000001.1.dat | WIDTH | 0 | 587 | 648 |

Lastly step 112 extends and blurs edges of the product image. This smoothes edges on images and effectively crops extra white space.

Step 114 receives as input the product image mask file from step 112. As a function of shape class of the product, Step 114 refers to the corresponding class template 17 (geometry data generic to the class) and models the shape map (outline) curve with a small number of line segments. Step 114 converts the product outline curve from the product image mask file into best fit line segments (in pixels). Step 114 employs an iterative process to optimize fit and reduce the number of line segments to a target goal.

Figure 3A:
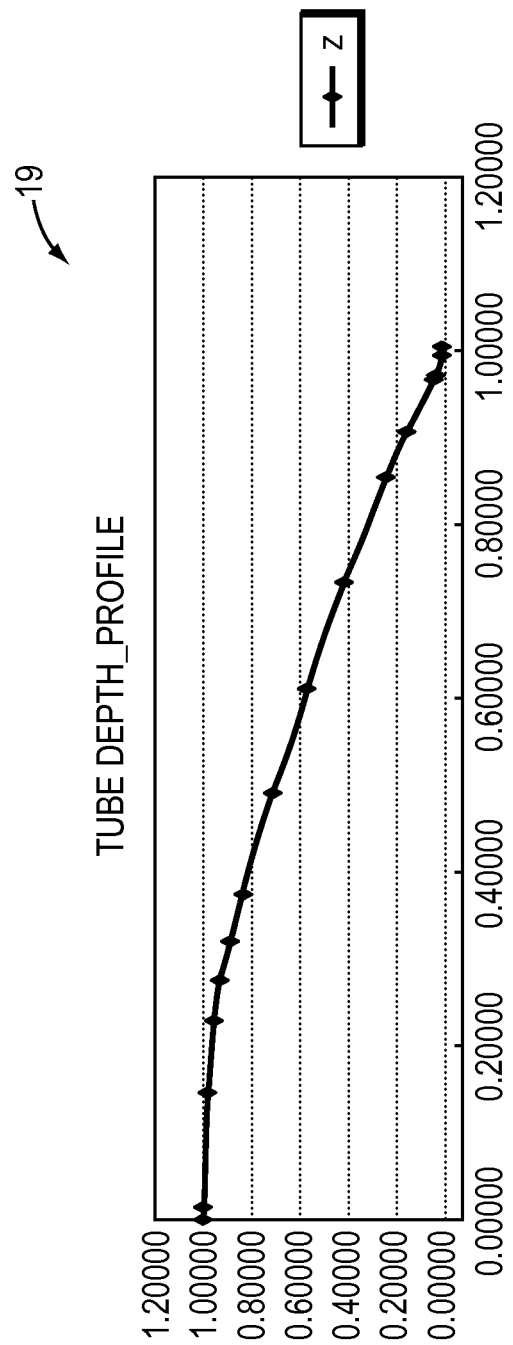
FIGS. 3A-3C are depth profiles for the Tube Class, Sack Class and Pouch Class, respectively in one embodiment.
Figure 3B:
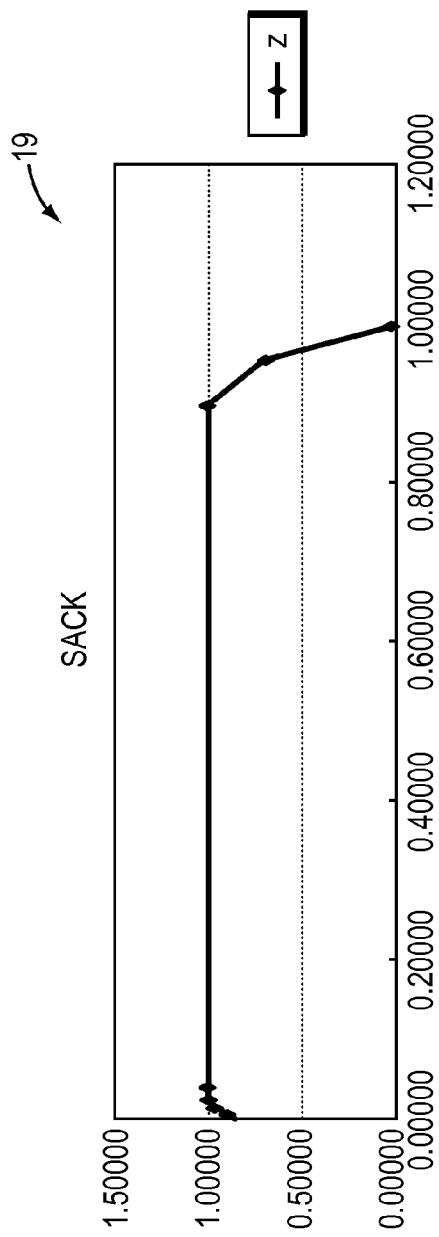
Figure 3C:
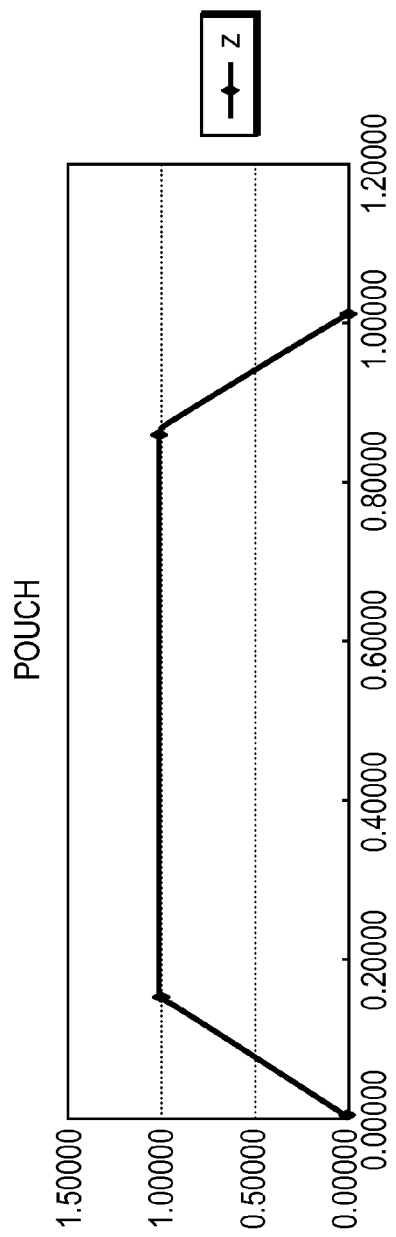

Next, step 114 generates a depth estimate using the shape class 15 of the product and depth profile rules 19 corresponding to that shape class. For many products, photographs are only available for the front and back product views. This means that information about product depth/shape is missing. Step 114 fills in this missing information by using the depth profile, determined by shape class 15, which in turn defines missing depth shape information. The depth profile for the TUBE shape class is displayed in FIG. 3A and in Table 3. Sample depth profiles for the SACK and POUCH shape classes in one embodiment are shown in FIGS. 3B and 3C respectively.

TABLE 3

TUBE Class Depth Profile

| TYPE | Y | Z | RULE |
|---|---|---|---|
| TUBE | 0.00000 | 1.00000 | INTERPOLATE |
| TUBE | 0.01183 | 1.00000 | INTERPOLATE |
| TUBE | 0.14704 | 0.98000 | INTERPOLATE |
| TUBE | 0.22535 | 0.95600 | INTERPOLATE |
| TUBE | 0.27380 | 0.92800 | INTERPOLATE |
| TUBE | 0.31775 | 0.89200 | INTERPOLATE |
| TUBE | 0.37183 | 0.84000 | INTERPOLATE |
| TUBE | 0.49127 | 0.72000 | INTERPOLATE |
| TUBE | 0.60563 | 0.58000 | INTERPOLATE |
| TUBE | 0.72958 | 0.42000 | INTERPOLATE |
| TUBE | 0.85070 | 0.24400 | INTERPOLATE |
| TUBE | 0.90310 | 0.16800 | INTERPOLATE |
| TUBE | 0.96620 | 0.06088 | INTERPOLATE |
| TUBE | 0.99155 | 0.01600 | INTERPOLATE |
| TUBE | 1.00000 | 0.01200 | INTERPOLATE |

As a result, Step 114 outputs product specific 3D shape file which provides a 3D object outline of the product scaled to meters. Height is outlined along the y-axis. Width minimum and maximum are given along the x-axis. And depth is outlined along the z-axis. The 3D shape file specifies the projected geometric outline of the 3D mesh for the front and side views of the product expressed in units of meters for example.

Figure 4:
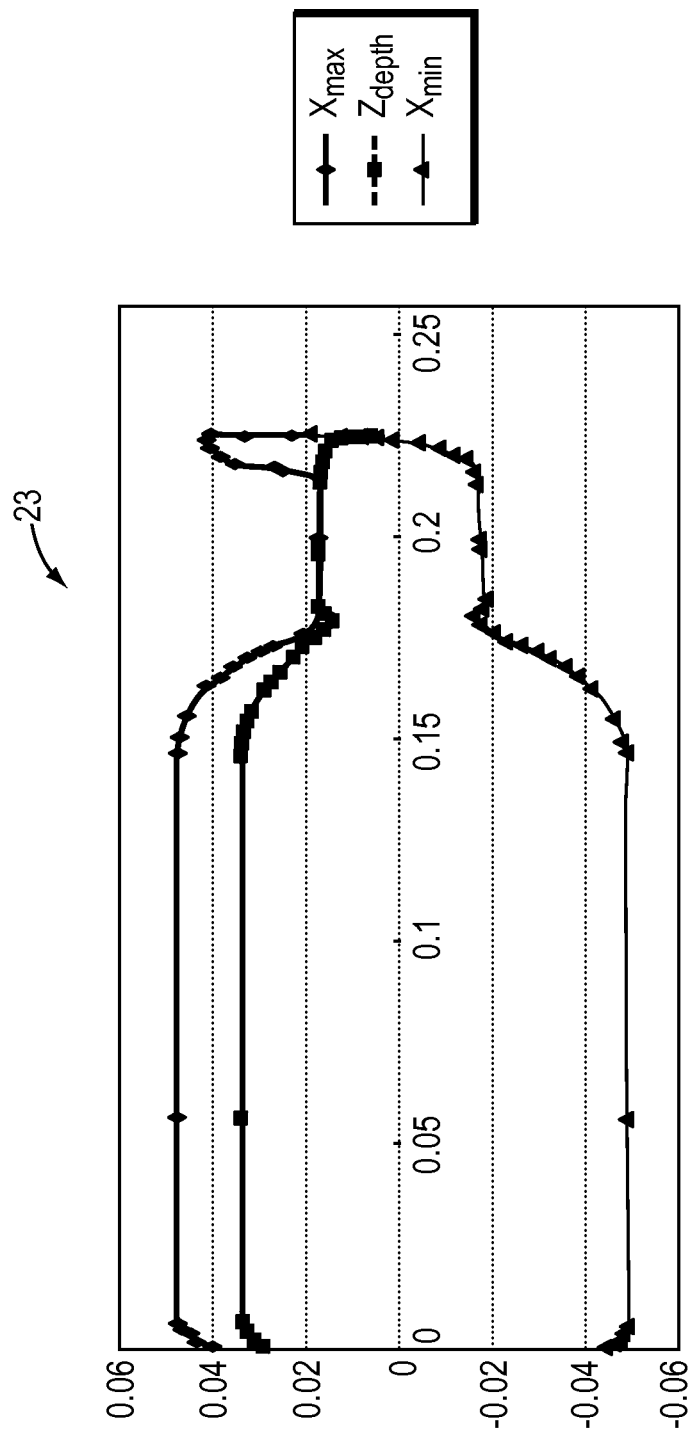
FIG. 4 is a detailed 3D shape graph having a supporting 3D shape/object outline file, for a subject in the Pump Handle Class in one embodiment.

In one embodiment, for example, the 3D shape file contains three line segment graphs (vectors) that provide geometrically precise mesh models of the left side of the product, the right side of the product and the depth of the product (assuming product depth is symmetrical). Table 4 shows sample data records from a 3D shape file generated for a product in the PUMP_HANDLE shape class. FIG. 4 shows the corresponding graph having Xmax, Xmin, and X-Midpoint coordinates plotted against the Y-axis.

TABLE 4

Sample 3D shape file for a product in the PUMP-HANDLE class.

| Index | Y | Xmax | Zdepth | Xmin | Midpoint |
|---|---|---|---|---|---|
| 1 | 0 | 0.040365 | 0.028681 | 0.045333 | 0.002484 |
| 2 | 0.000869 | 0.042973 | 0.030534 | 0.046699 | 0.001863 |
| 3 | 0.00236 | 0.045457 | 0.032299 | 0.048066 | 0.001366 |
| 4 | 0.003602 | 0.046824 | 0.033269 | 0.048562 | 0.000869 |
| 5 | 0.005216 | 0.047445 | 0.033711 | 0.048811 | 0.000745 |
| 6 | 0.005341 | 0.047693 | 0.033887 | 0.048811 | 0.000621 |
| 7 | 0.056263 | 0.047693 | 0.033887 | 0.048811 | 0.000621 |
| 8 | 0.146308 | 0.047569 | 0.033799 | 0.048687 | 0.000621 |
| 9 | 0.14991 | 0.047072 | 0.033446 | 0.048066 | 0.000497 |
| 10 | 0.155126 | 0.045706 | 0.032475 | 0.046078 | 0.000248 |
| 11 | 0.162578 | 0.041483 | 0.029475 | 0.041607 | 0.000124 |
| 12 | 0.165435 | 0.038875 | 0.027622 | 0.038875 | 0 |

Restated, the 3D shape file effectively provides a detailed 3D shape graph 23. The detailed 3D shape graph 23 represents an orthographically correct outline shape of the subject product from at least the front and back view points. Thus the detailed 3D shape graph 23 (3D shape file) provides 3D object outline information of the specific packaged product.

Figure 5:
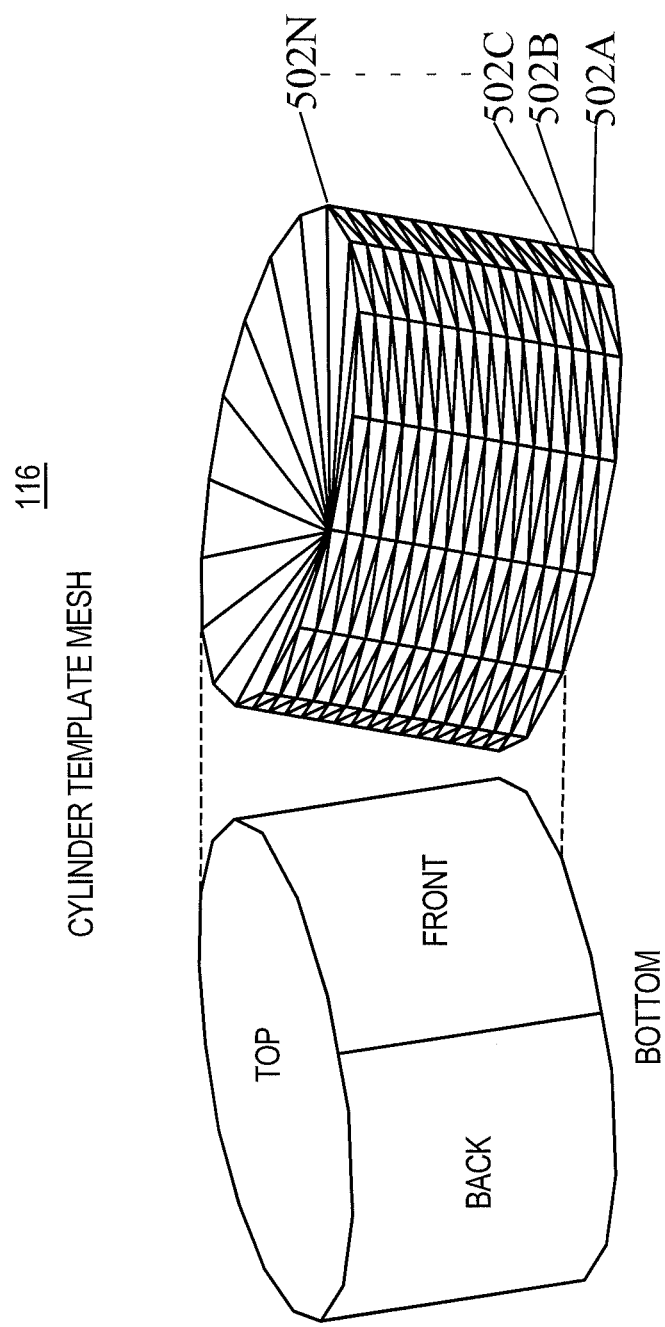
FIGS. 5 and 6 are schematic views of mesh generation in one embodiment in which a series of cross-sectional regions is determined and utilized.
Figure 6:
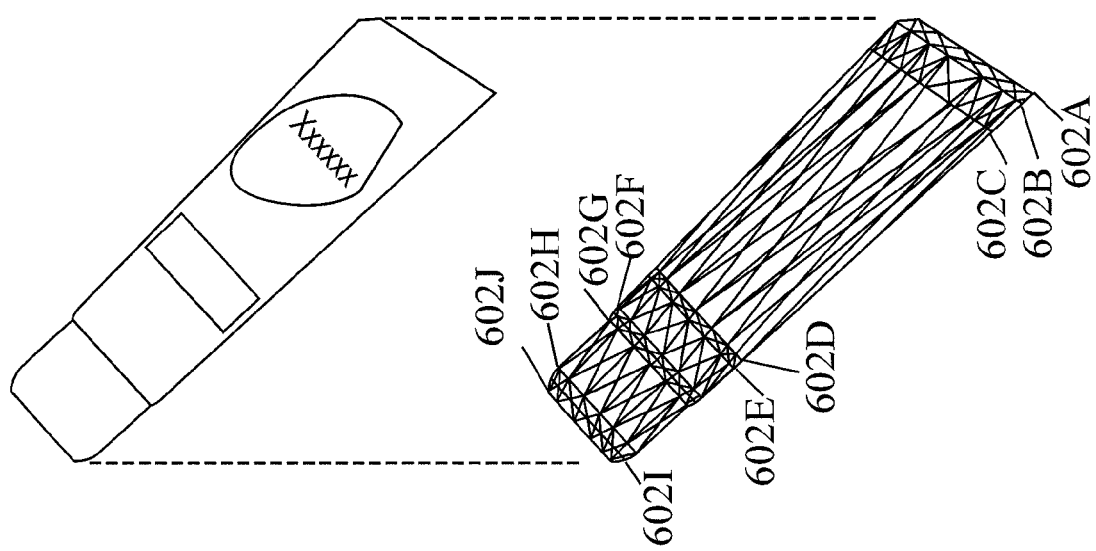

Continuing with FIG. 1C, step 116 of modeler process 103 reads the 3D shape file (detailed 3D shape graph) 23 output by Step 114. Based on the shape class of the subject product, Step 116 determines corresponding shape class template 17 dimensions and generates a cylinder template file. In one embodiment, BOX, BATTERY and BAG classes are modeled from a 6-sided cylinder, while the other class types use a default cylinder with segment size 16 for example. In embodiments, a GENERATE 3D SHAPE function builds product models by mapping shape vertices onto a standardized geometric primitive (the template 17 generated cylinder). For example, bottle shaped objects can all be viewed as deformed cylinders, and can all be created from the single cylinder template file having a standardized mesh based on the number of vertical and radial segments specified in the 3D shape file/detailed 3D shape graph 23 for a particular product. Object shape height for example is specified by radial segments. FIG. 5 illustrates such a cylinder template mesh used in one embodiment. The template mesh is generic to the respective shape class. Illustrated in FIG. 6 is the template mesh for the TUBE shape class. The cross sections 602A, 602B, 602C . . . 602J are based on the mathematical formula for an ellipse instead of the circular cross sections 502A, 502B, 502C . . . 502N of the cylinder in FIG. 5. Known techniques for generating these standard meshes from 3D templates 17 are utilized.

The strategy of building product models from mesh templates 17 is a key feature of the applicant's content generation process. Generation of 3D models from templates 17 results in a highly uniform set of product models, and is critical to the scalability of the invention process to enable hundreds of thousands of 3D product models to be reliably created from simple view-based photographs (2D images).

In addition to specifying standardized mesh geometry, the templates 17 also organize mesh faces into material groups onto which textures generated from product 2D photos are mapped.

Finally, use of templates mesh files 17 enables precise control of target/average output model geometry size. Tradeoffs between lower and higher resolution mesh models can easily be adjusted. For example one could produce a very high polygon count mesh for close up viewing (a close up model), and a very low polygon count mesh for on shelf placement (a shelf view model).

Next, step 116 creates cross-sections (X-Z plane maps) from 3D shape file (detailed 3D shape graph 23), based on shape class rules 19. Preferably, a cross section processing module 31 implements this step. The cross section processing module 31 determines a series of cross sectional regions of the detailed 3D shape graph 23. Each cross sectional region has a respective cross section with respect to a longitudinal axis of the subject product. The cross section for a given cross sectional region is different than (i) the respective cross section of an immediately succeeding cross sectional region in series order and (ii) the respective cross section of an immediately preceding cross sectional region in series order, such that cross sections change from one cross sectional region to a next cross sectional region in series order.

Next, step 116 combines the template 17 generated cylinder mesh and the series of cross sectional regions (generated by processing module 31). In particular, a mesh generator 41 walks through the template 17 generated cylinder mesh and builds a product specific 3D model from the generated cross-sectional data output from processing module 31.

In the example, mesh generator 41 transforms the template 17 generated cylinder mesh based on the product specific dimensions saved in the 3D shape file/detailed 3D shape graph 23. Treating the package shape as a set of 2 dimensional slices, mesh generator 41 iterates through the shape file/detailed 3D shape graph 23 data using the x-Midpoint, x-Min, x-Max, and z-Depth field data to construct a cross section based on the product shape class.

For the BATTERY shape class, two components are generated and processed in Steps 114 and 116. In addition to a cardboard insert processing following the above described, Step 114 creates a clamshell extrusion shape file 23. The clamshell extrusion is a beveled square based on the shape of the blister pack content. If the extrusion shape file 23 exists, then Step 116 processing adds the clamshell mesh having product specific geometry to the output of this step. Table 5 provides an example of 2D image mask data for the cardboard insert having a cutout for accommodating the clamshell extrusion.

TABLE 5

Image mask file for cardboard insert component of Battery Pack product.

| FILE | DIMENSION | INDEX | MIN | MAX |
|---|---|---|---|---|
| 1133321601.1.dat | CUTOUT | 1810 | −1 | −1 |
| 1133321601.1.dat | CUTOUT | 1809 | −1 | −1 |
| 1133321601.1.dat | CUTOUT | 1808 | −1 | −1 |
| ... | | | | |
| 1133321601.1.dat | CUTOUT | 1778 | 213 | 1282 |
| 1133321601.1dat | CUTOUT | 1777 | 213 | 1282 |
| 1133321601.1.dat | COTOUT | 1776 | 213 | 1282 |
| ... | | | | |
| 1133321601.1.dat | CUTOUT | 1113 | 213 | 1282 |
| 1133321601.1.dat | CUTOUT | 1112 | 213 | 1282 |

TABLE 5-continued

Image mask file for cardboard insert component of Battery Pack product.

| FILE | DIMENSION | INDEX | MIN | MAX |
|---|---|---|---|---|
| 1133321601.1.dat | CUTOUT | 1111 | −1 | −1 |
| 1133321601.1.dat | CUTOUT | 1110 | −1 | −1 |

Step 118 calculates planar image maps for front and back images from model vertices output by step 116. That is, step 118 applies the original product images as planar textures onto the generated 3D mesh. Because mesh dimensions are based on a photograph of the front of each product, the front photograph can be aligned with the underlying mesh to an accuracy of 1 pixel. In some embodiments, Step 118 applies texture stretching and texture adjustment rules based on shape class 15 of the product. Common techniques for planar mapping and texture stretching are employed. Step 118 outputs the resulting 3D model 25. In some embodiments, output model 25 is a 3D model file containing geometry and texture maps.

FIGS. 7A-7C is a sample model that further illustrates the invention technique. The first image (FIG. 7A) is an initial 3D model of a wine glass. The second image (FIG. 7B) is a texture file, created from an orthographic display of the original model mesh. The third image (FIG. 7C) is the 3D model of FIG. 7A with a planar mapping displaying the mesh texture file of FIG. 7B on the model surface.

This technique can successfully mass produce 3D models of consumer goods packaging for a variety of shape types/classes 15. While planar mapping results in some pixel stretching on the sides of the package model, the stretching can be minimized by working with higher resolution product photographs. And when these models are displayed in a store shelf context, where viewing angles are restricted, product models based on this technique appear highly realistic.

The output 3D model file 25 is configured for use in serving Web pages of retail store/online shopping, video gaming and other user-interactive applications. Common web page serving technology is employed.

Figure 8A:
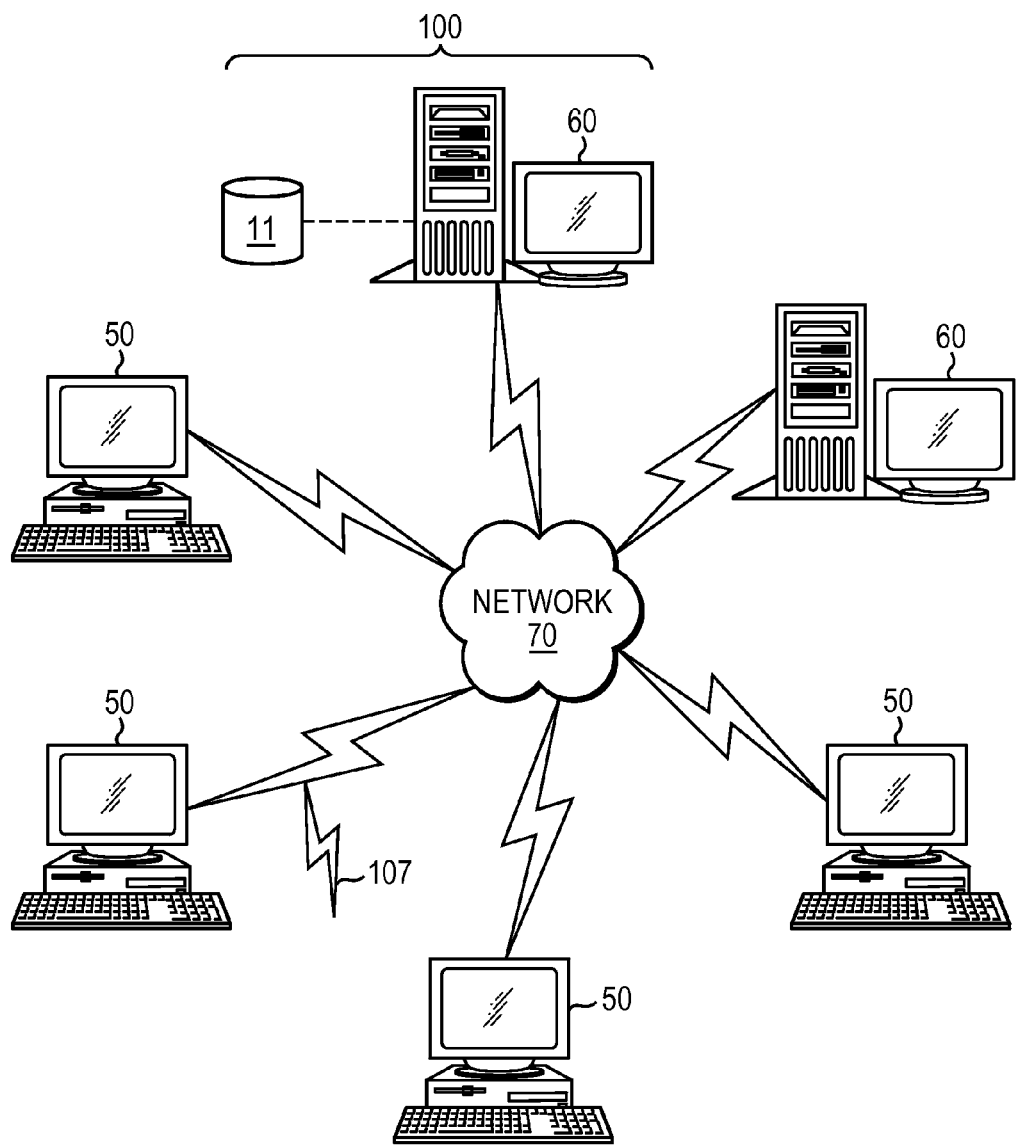
FIGS. 8A-8B are a schematic view and block diagram respectively of a computer system embodying the present invention.

FIG. 8A illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 8B:
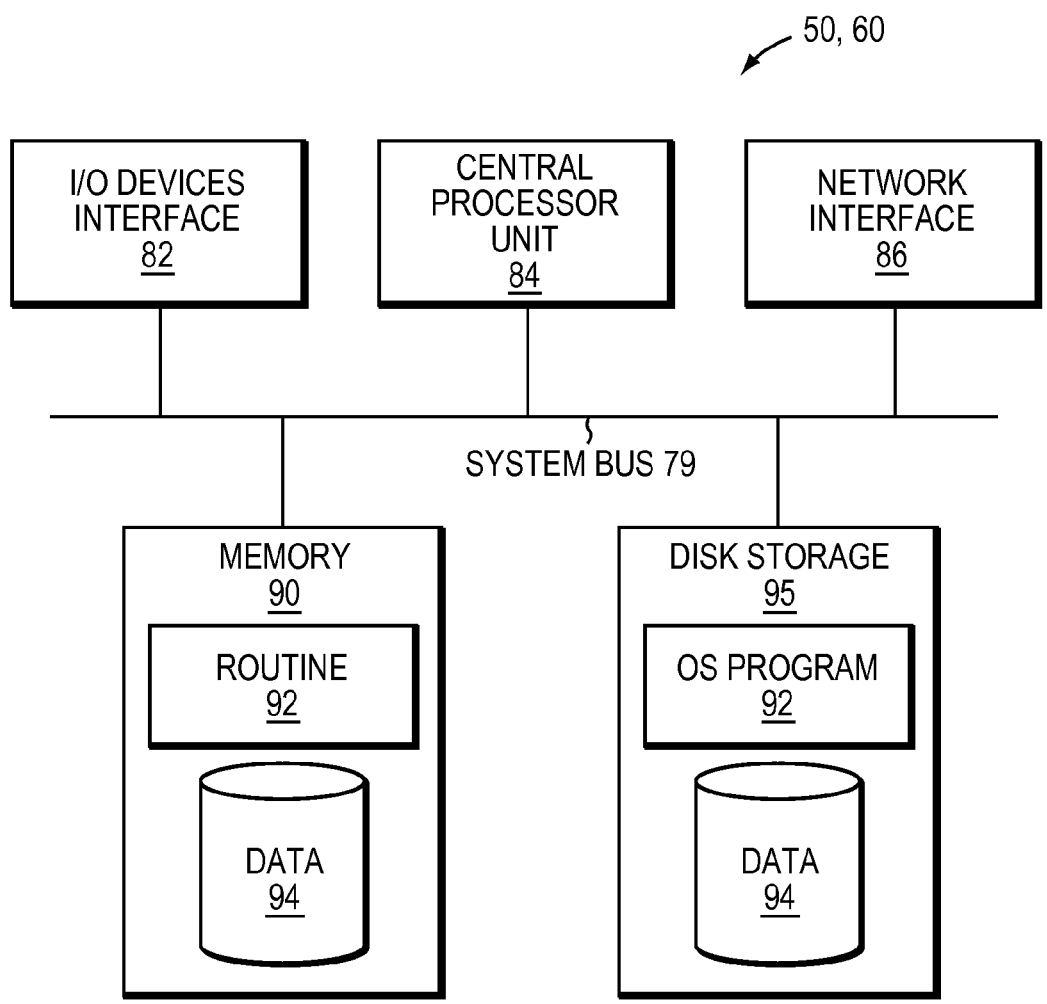

FIG. 8B is a diagram of the internal structure of a computer (e.g., client processor/device 50 or server computers 60) in the computer system of FIG. 8A. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 8A).

Memory 90 provides volatile storage for computer software instructions 92 and data 94 used to implement an embodiment of the present invention (e.g., data extractor 21, cross section processing module 31, mesh generator 41, 3D modeler 13 and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

According to the above discussion, there are three features of Applicant's approach to generating 3D models 25 of packaged goods that are distinctive. First, the present invention enables mass production of high resolution 3D package models. By "mass production" Applicant means the ability to create entire shelves or categories of packaged goods on a store-wide basis. The estimate of the number of unique items in a typical grocery store is on the order of 50,000. By "high resolution" Applicant means that product labels are readable. The invention 3D Models 25 are typically based on original photograph resolutions between 200 and 300 dpi. DPI here is defined as image pixels per inch, relative to the actual product dimensions.

Second, the present invention employs use of regular, template based mesh primitives in the construction of product shape types. The 3D models 25 constructed using the invention process have precise, but simplified geometry. This distinguishes Applicant's approach from other photo modeling applications which generate complex and irregular meshes.

Third, the present invention uses planar projection and texture stretching. The technique of constructing models primarily from front and back images can be identified by close visual inspection of product models. In particular, planar projection creates a visible seam between product front and back sides. Embodiments of the present invention minimize visibility of this seam by applying texture stretching.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of 3D modeling comprising:
    accessing product data of a subject consumer good product, the product data including 2D image data of the subject consumer good product, the 2D image data being from a single given calibrated viewpoint, the single given calibrated viewpoint including at least a front viewpoint, the product data further including shape information of the subject consumer good product;
    extracting the shape information from the product data, said extracting including obtaining a 2D outline shape of the consumer good product from the single given calibrated viewpoint of the 2D image data and obtaining a 3D shape class of the subject consumer good product from the shape information, the 3D shape class including a respective 3D template providing proportional geometries in three dimensions for the object shape representative of the class and corresponding rules including depth profile rules;
    using the obtained 2D outline shape and 3D shape class, generating a detailed 3D shape graph, the detailed 3D shape graph representing an orthographically correct outline shape of the subject from at least the front viewpoint;
    as a function of the obtained 3D shape class, generating a 3D mesh of the subject consumer good product from the detailed 3D shape graph; and
    projecting onto the 3D mesh images of the subject consumer good product from the 2D image data, said projecting forming a 3D model of the subject consumer good product, the formed 3D model being configured for display on output.

2. The method of claim 1 wherein the shape information includes width, height and depth measurements of the subject consumer good product and includes an indication of 3D shape class of the subject consumer good product.

3. The method of claim 1 wherein the step of generating a 3D mesh of the subject consumer good product comprises:
    determining a series of cross sectional regions of the detailed 3D shape graph, each cross sectional region having a respective cross section with respect to a longitudinal axis of the subject consumer good product and a dimension, wherein the dimension of the cross section for a given cross sectional region is different than (i) the dimension of the respective cross section of an immediately succeeding cross sectional region in series order and (ii) the dimension of the respective cross section of an immediately preceding cross sectional region in series order, such that the dimension of each of the cross sections change from one cross sectional region to a next cross sectional region in series order; and using the series of cross sectional regions, defining the 3D mesh of the subject consumer good product.

4. The method of claim 3 wherein the step of defining the 3D mesh of the subject consumer good product further includes determining a depth profile of the subject consumer good product along the longitudinal axis.

5. The method of claim 4 wherein the step of determining a depth profile employs shape generation.

6. The method of claim 3 wherein the step of determining a series of cross sectional regions of the detailed 3D shape graph includes curve fitting between any respective cross sectional region and at least one of the immediately succeeding cross sectional region and the immediately preceding cross sectional region, wherein the cross sectional regions correspond to the 2D outline shape.

7. The method of claim 3 wherein the step of generating a mesh includes combining the detailed 3D shape graph, the determined series of cross sectional regions and a depth profile for the determined 3D shape class of the subject consumer good product.

8. The method of claim 3 wherein the step of generating a mesh includes combining the detailed 3D shape graph, the determined series of cross sectional regions and a depth profile of the subject consumer good product.

9. The method of claim 1 wherein the step of projecting employs planar projection to project 2D images of the subject consumer good product onto the generated mesh, and as a result forms the 3D model of the subject consumer good product.

10. The method of claim 1 wherein the subject consumer good product is a packaged good.

11. The method of claim 10 wherein the packaged good has a container of any one or combination of types including:
   a generally cylindrical bottle,
   a generally cylindrical bottle with pump action type dispensing end,
   a generally tubular dispensing tube,
   an effectively box shaped carton,
   a generally pillow shaped sack or pouch, and
   a generally sack-like container or pouch, with a planar end.

12. A computer-based 3D modeling apparatus comprising:
   a source of product data of a subject consumer good product, the product data including 2D image data of the subject consumer good product, the 2D image data being from a single given calibrated viewpoint, the single given calibrated viewpoint including at least a front viewpoint, the product data further including shape information of the subject consumer good product;
   an extractor accessing the source and extracting the shape information from the product data, the extractor obtaining a 2D outline shape of the consumer good product from the single given calibrated viewpoint of the 2D image data and obtaining a 3D shape class of the subject consumer good product, the 3D shape class including a respective 3D template providing proportional geometries in three dimensions for the object shape representative of the class and corresponding rules including depth profile rules;
   using the obtained 2D outline shape and 3D shape class, generating a detailed 3D shape graph, the detailed 3D shape graph representing an orthographically correct outline shape of the subject consumer good product from at least the front viewpoint;
   a mesh generator coupled to receive the detailed 3D shape graph, and as a function of the obtained 3D shape class, the mesh generator generating a 3D mesh of the subject consumer good product from the detailed 3D shape graph; and
   a modeler projecting onto the 3D mesh images of the subject consumer good product from the 2D image data, said projecting forming a 3D model of the subject consumer good product, the formed 3D model being configured for display on output.

13. The computer-based 3D modeling apparatus of claim 12, wherein the calibrated viewpoint also includes one or more of a back viewpoint, top viewpoint and side viewpoint.

14. The apparatus of claim 12 wherein the shape information includes width, height and depth measurements of the subject consumer good product and includes an indication of 3D shape class of the subject consumer good product.

15. The apparatus of claim 12 wherein the mesh generator generates the 3D mesh of the subject consumer good product by:
   determining a series of cross sectional regions of the detailed 3D shape graph, each cross sectional region having a respective cross section with respect to a longitudinal axis of the subject consumer good product and a dimension, wherein the dimension of the cross section for a given cross sectional region is different than (i) the dimension of the respective cross section of an immediately succeeding cross sectional region in series order and (ii) the dimension of the respective cross section of an immediately preceding cross sectional region in series order, such that the dimension of each of the cross sections change from one cross sectional region to a next cross sectional region in series order; and
   using the series of cross sectional regions, defining the 3D mesh of the subject consumer good product.

16. The apparatus of claim 15 wherein the mesh generator defining the 3D mesh of the subject consumer good product further includes determining a depth profile of the subject consumer good product along the longitudinal axis.

17. The apparatus of claim 16 wherein the determining a depth profile employs shape generation.

18. The apparatus of claim 15 wherein the determining a series of cross sectional regions of the detailed 3D shape graph includes curve fitting between any respective cross sectional region and at least one of the immediately succeeding cross sectional region and the immediately preceding cross sectional region, wherein the cross sectional regions correspond to the 2D outline shape.

19. The apparatus of claim 15 wherein the mesh generator combines the detailed 3D shape graph, the determined series of cross sectional regions and a depth profile of the determined 3D shape class of the subject consumer good product.

20. The apparatus of claim 15 wherein the mesh generator combines the detailed 3D shape graph, the determined series of cross sectional regions and a depth profile of the subject consumer good product.

21. The apparatus of claim 12 wherein the modeler employs planar projection to project 2D images of the subject consumer good product onto the generated mesh, and as a result forms the 3D model of the subject consumer good product.

22. The apparatus of claim 12 wherein the subject consumer good product is a packaged good.

23. The apparatus of claim 22 wherein the packaged good has a container of any one or combination of types including:
- a generally cylindrical bottle,
- a generally cylindrical bottle with pump action type dispensing end,
- a generally tubular dispensing tube,
- an effectively box shaped carton,
- a generally pillow shaped sack, bag or pouch, and
- a generally sack-like container, bag or pouch, with a planar end.

24. The computer-implemented method of claim 1, wherein the calibrated viewpoint also includes one or more of a back viewpoint, top viewpoint and side viewpoint.

* * * * *